(12) United States Patent
Roberts (10) Patent No.: US 9,479,830 B2
(45) Date of Patent: Oct. 25, 2016

(54) SYSTEM AND METHOD FOR DELIVERING MEDIA CONTENT AT PREDETERMINED TIMES

(71) Applicant: Peter Murray Roberts, Eagle, ID (US)

(72) Inventor: Peter Murray Roberts, Eagle, ID (US)

(*) Notice: Subject to any disclaimer, the term of this patent is extended or adjusted under 35 U.S.C. 154(b) by 0 days.

(21) Appl. No.: 14/971,772

(22) Filed: Dec. 16, 2015

(65) Prior Publication Data

US 2016/0173943 A1 Jun. 16, 2016

Related U.S. Application Data

(60) Provisional application No. 62/092,523, filed on Dec. 16, 2014.

(51) Int. Cl.
| | |
|---|---|
| *H04N 7/173* | (2011.01) |
| *H04N 21/458* | (2011.01) |
| *H04N 21/61* | (2011.01) |
| *H04N 21/488* | (2011.01) |
| *H04N 21/239* | (2011.01) |
| *H04N 21/24* | (2011.01) |
| *H04N 21/658* | (2011.01) |

(52) U.S. Cl.
CPC ........ *H04N 21/458* (2013.01); *H04N 21/2393* (2013.01); *H04N 21/2407* (2013.01); *H04N 21/4882* (2013.01); *H04N 21/6125* (2013.01); *H04N 21/658* (2013.01)

(58) Field of Classification Search
CPC .......... H04N 21/458; H04N 21/6125; H04N 21/4882; H04N 21/2993; H04N 21/2407; H04N 21/658
See application file for complete search history.

(56) References Cited

U.S. PATENT DOCUMENTS

| | | | |
|---|---|---|---|
| 7,412,532 B2* | 8/2008 | Gondhalekar | ... H04N 21/23617 370/264 |
| 2003/0061183 A1* | 3/2003 | Schaffer | ................ H04N 7/163 706/8 |
| 2014/0281971 A1* | 9/2014 | Isbell, III | .......... G06F 17/30053 715/716 |
| 2015/0264431 A1* | 9/2015 | Cheng | .............. H04N 21/44218 725/10 |

* cited by examiner

*Primary Examiner* — Oschta Montoya
(74) *Attorney, Agent, or Firm* — George C. Rondeau, Jr.; Davis Wright Tremaine LLP (57) ABSTRACT

A method and system for delivering media content to a user at predetermined times. A processing unit of the system receives streamed media content data and causes a display device to display the media content. The method and system include receiving user instructions and streaming media content according to the user instructions.

20 Claims, 9 Drawing Sheets

SYSTEM AND METHOD FOR DELIVERING MEDIA CONTENT AT PREDETERMINED TIMES

CROSS-REFERENCE

The current application claims priority to U.S. Provisional Patent Application No. 62/092,523, filed Dec. 16, 2014, the entirety of which is hereby incorporated by reference.

FIELD OF INVENTION

The current invention generally relates to systems and methods for delivering media content at predetermined times.

BACKGROUND

Video over IP streaming applications, streaming platforms, mobile devices, and display devices fail to facilitate a full night of sleep or to leverage the potential of a display device as an alarm clock. Currently available systems, devices, and methods do not allow transition back and forth between locally sourced content to video over IP at a specific time and/or with specific user defined content. Currently screen savers are not conducive to sleeping as they are typically too bright and do not provide a choice of audio. Further, consumers cannot program a media delivery system to resume streaming a specific video over IP on demand at a specific time after a screensaver.

Previously implemented systems fail to overcome the high expense and heavy burden on system resources associated with streaming media content. Temporary memory cache is limited in size and media content may take a long time to download, resulting in lapse or lag in the media content.

In previously implemented systems and methods, users could not customize and preprogram the content that an application will play at a particular date and time. For instance, previous streaming media systems do not allow users to preprogram a wake-up message to play for a child or a parent at a specific date and time (e.g., 8 AM next Friday), or on Thanksgiving or Christmas morning. Previously implemented systems fail to provide a way to superimpose a reminder message (e.g., issuing a medication reminder every day at noon) or request confirmation that the reminder message was received. Previously implemented systems do not allow a user to pre-program or pre-select the media content that will automatically play when an application is opened in a certain scheduled time (e.g., between 8 and 9 am Saturday or Sunday morning). Previously implemented systems do not allow for a user to automate playing a user-customized media content playlist for enhancing a user's sleep.

DETAILED DESCRIPTION

Figure 1:
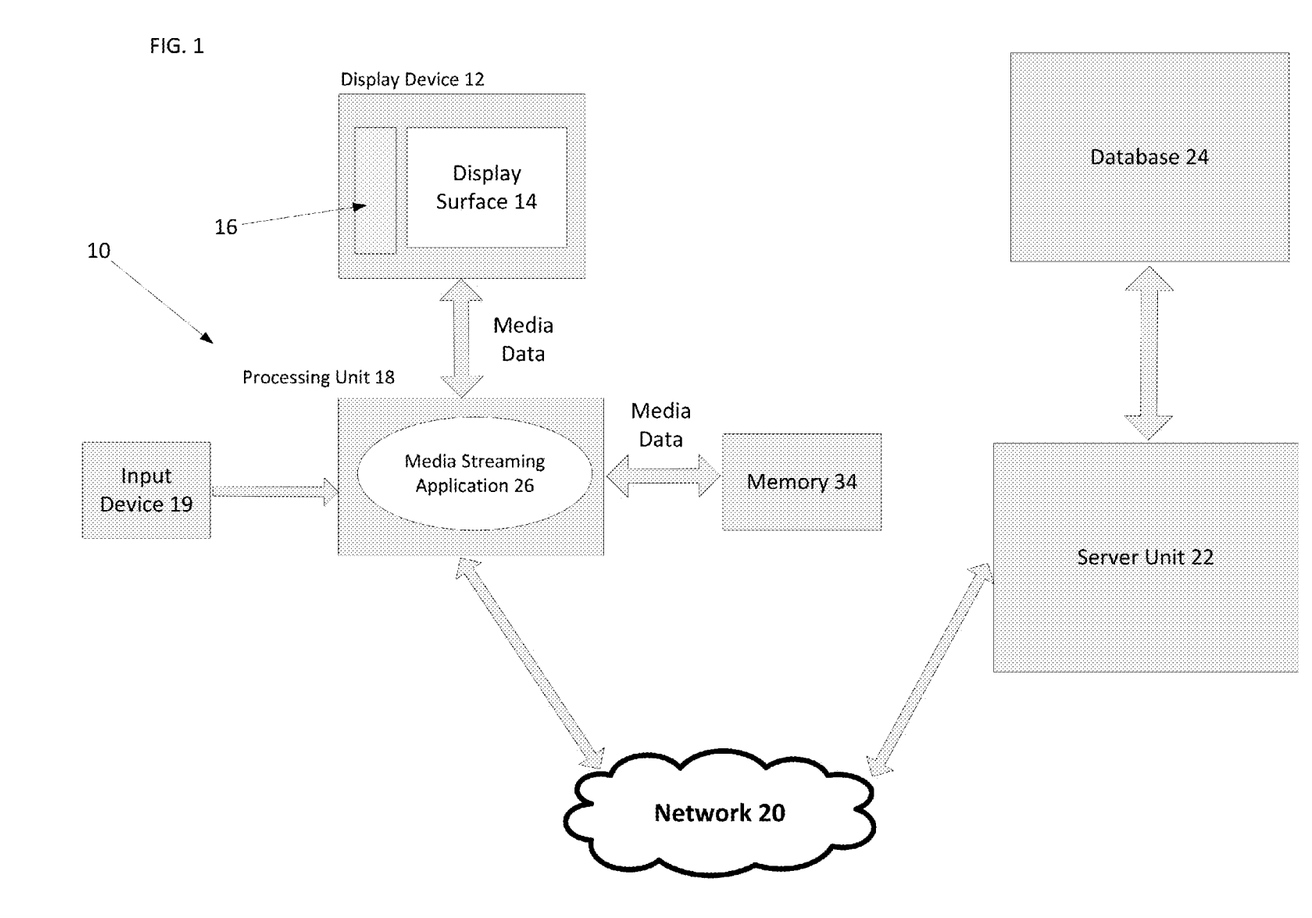
FIG. 1 illustrates a schematic view of a media delivery system according to a first embodiment.

A media delivery system 10 is shown in FIG. 1 according to a present embodiment in which different media content may be delivered to a user at predetermined times. The media delivery system 10 is operable to allow the user to input settings instructing the streaming system to stream first media content at a first selected time, play second media content at a second selected time, then stream a third media content at a third selected time.

The user may input settings that define the first selected time, the second selected time, the third selected time, the first media content, the second media content, and the third media content. At the first selected time, the media delivery system 10 may stop currently playing media on the display device and begin streaming the first media content over the internet to be played on the display device. At the second selected time, the media delivery system 10 will cease streaming the first media content and begin playing the second media content stored in a local memory. The second media content will play on the display device until the third selected time, at which point the delivery system 10 will stop playing the second media content and begin streaming the third media content on the display device.

The media delivery system 10 provides a user-defined atmosphere at specified times and dates, which may facilitate a consistent sleeping environment, by way of the following non-limiting example. The atmosphere may be defined by the user at or before bedtime. During the first time period specified by the user, the media delivery system 10 may provide a peaceful atmosphere for falling asleep, such as a Pacific coast sunset accompanied by the sound of rolling waves. After the first time period, the media delivery system 10 may display a dark screen and generate low-volume cricket noises for the second time period, which is a period of time during which the user is sleeping. At a third time period, the media delivery system 10 prompts the user to wake up by providing video of a sun slowly rising accompanied by peaceful classical music.

The media delivery system 10 may comprise a display device 12, a processing unit 18, an input device 19, a network 20, a server unit 22, a database 24, and a local memory 34, as shown in FIG. 1. The display device 12 has a display surface 14 configured to display an image and a sound generation unit 16 configured to produce sound. The display device 12 may be a television, a computer monitor, a mobile phone display screen, or a tablet display screen, by way of non-limiting example. The display device 12 is configured to receive media data comprising video data and/or audio data from the processing unit 18. The processing unit 18 represents any of computers, smartphones, tablet computers, laptop computers, netbook computers, smart televisions, set-top boxes, or other similar computing devices. In some embodiments, the display device 12 and the processing unit 18 may be housed in a single unit. In other embodiments, the display device 12 and the processing unit 18 are separate units that form the media delivery system 10. The processing unit 18 is configured to host or execute a media streaming application 26, as described below in greater detail.

Figure 2:
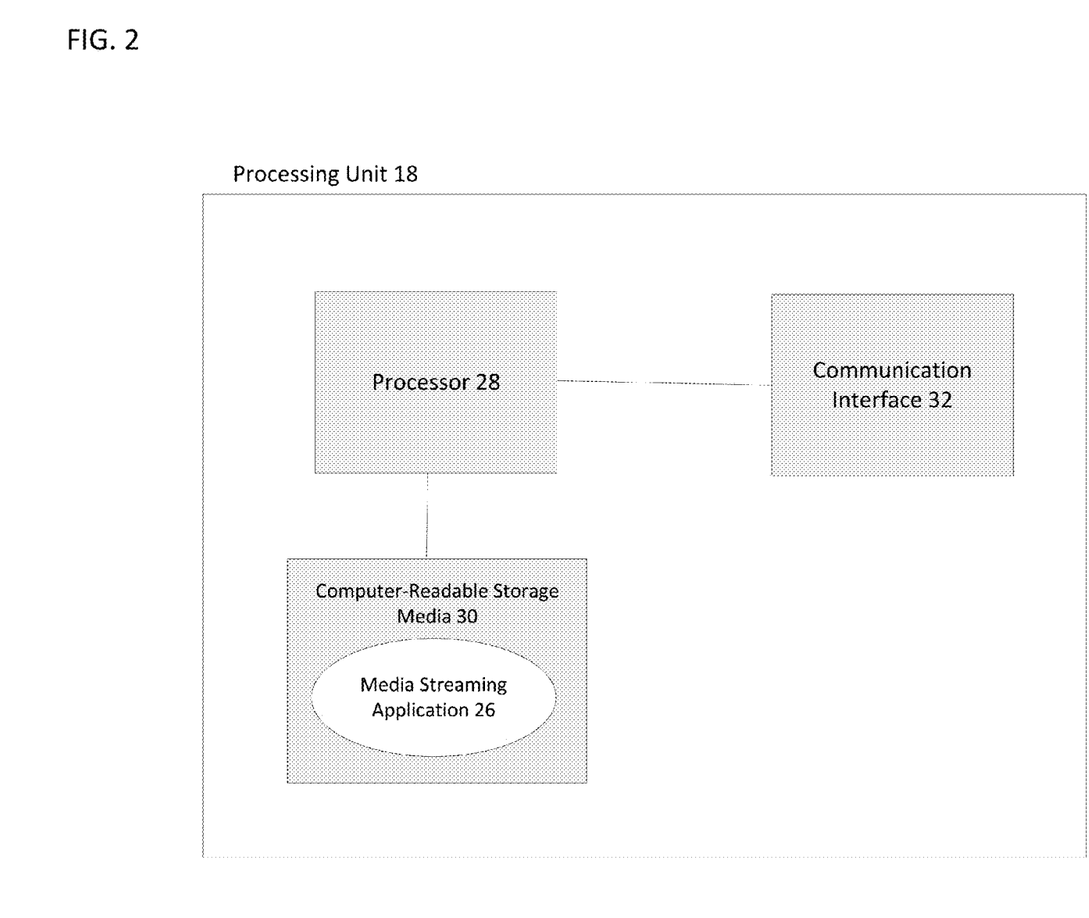
FIG. 2 illustrates a schematic view of a processing unit of the media delivery system of FIG. 1.

An implementation of the processing unit 18 that may be used in connection with the embodiments described herein is shown in FIG. 2. The processing unit 18 may include one or more processors 28 for executing the media streaming application 26, and one or more computer-readable storage media 30 for storing the media streaming application. The processing unit 18 may include a communication interface 32 for transmitting data to and receiving data from other devices over network 20. The communication interface 32 is not particularly limited and may include any of a wireless communication transceiver (e.g., Wi-Fi transceiver, RF transceiver, mobile phone transceiver, Li-Fi transceiver, IrDa transceiver, Bluetooth transceiver, satellite transceiver) or a wired communication device (e.g., internet modem, fiber-optic transceiver, telephonic systems, USB). The network 20 may be a wide area network (WAN) facilitating communication between two or more local networks. The processor 28 may comprise any of a computer processing unit (CPU), field-programmable gate array (FPGA), application-specific integrated circuit (ASIC), or similar processing unit. The storage media 30 is a data storage component comprising any of ROM, RAM, EEPROM, or flash memory, by way of non-limiting example. The processor 28 is configured to write and read data to and from the storage media 30 and the memory 34.

The memory 34 is a non-volatile data storage component for locally storing media data including image data, video data, or audio data, as described below. In some embodiments, the memory 34 is a storage device located on a local area network accessible via the communication interface 32. Memory 34 is a data storage component that is accessible by the processing unit 18 on a local area network (LAN) or directly available on a local hard drive. In other embodiments, the memory 34 may be a local storage device that is directly attached to the processing unit 18 or that is included in the storage media 30.

Figure 3:
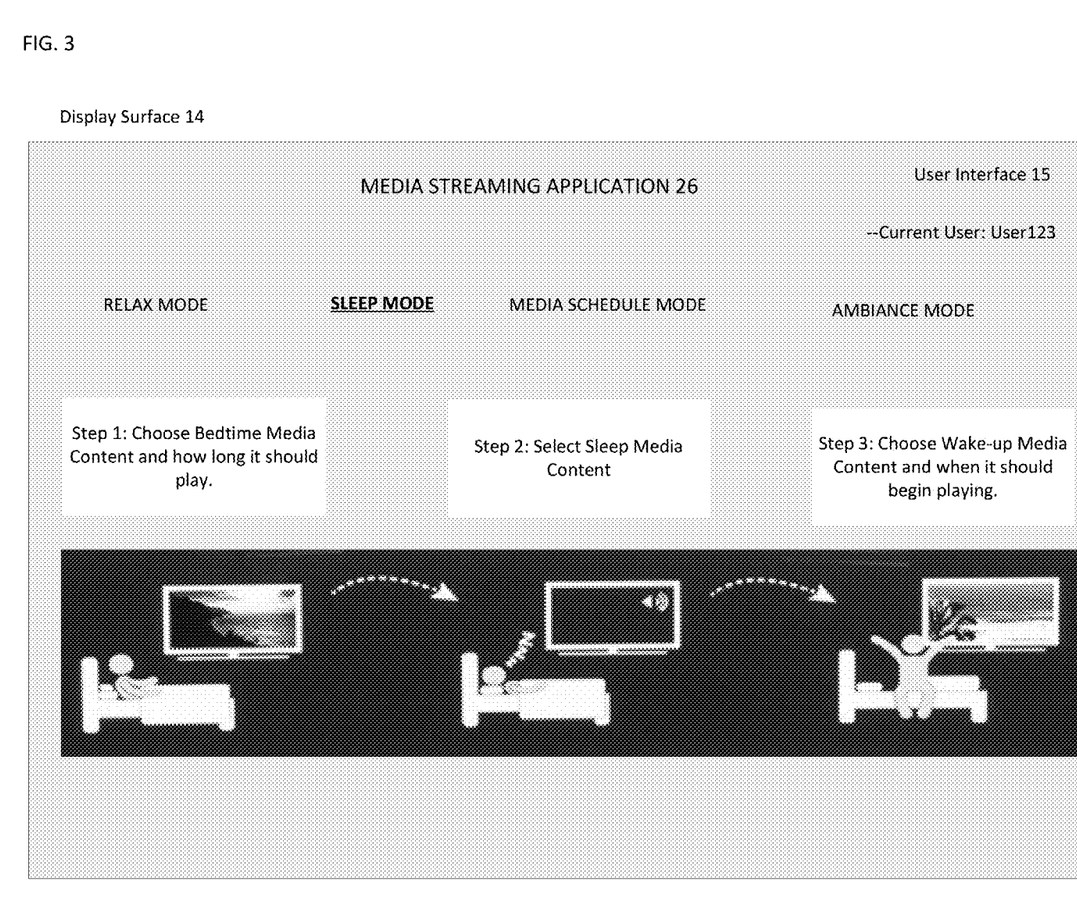
FIG. 3 illustrates a first view of a user interface displayed on a display device of the media delivery system of FIG. 1.

The user may operate the input device 19 to access the media streaming application 26. As shown in FIG. 3, a user interface 15 of the application 26 is displayed on the display screen 14 of the display device 12. The user interface 15 includes a user identity verification process (i.e., user login area) wherein a user may enter user identification information to access, retrieve, and edit personalized application settings on the server unit 22. The user may select different modes of the application 26 on an interactive menu of the user interface 15, including a sleep mode, a relax mode, a media schedule mode, or an ambiance mode, by way of non-limiting example. The application 26 may provide a brief operating description of each mode. Operation of the sleep mode is provided as an example of the operation of the application 26 that is illustrative of one aspect of the media delivery system 10 and not intended to limit the scope of its operation.

The user interface 15 shown in FIG. 3 indicates that there are at least three steps for setting up the sleep mode. In a bedtime period settings selection step, the user selects the first media content to play at bedtime and a duration indicating how long the first media content will play or indicating when the first media content will stop. In a sleep period settings selection step, the user selects media content to play while the user is asleep. In a wake-up period settings selection step, the user selects media content to wake the user up in the morning. Once the user selects the desired mode of the application 26 using the input device 19, the application will guide the user through the process of setting up the desired mode.

Figure 4:
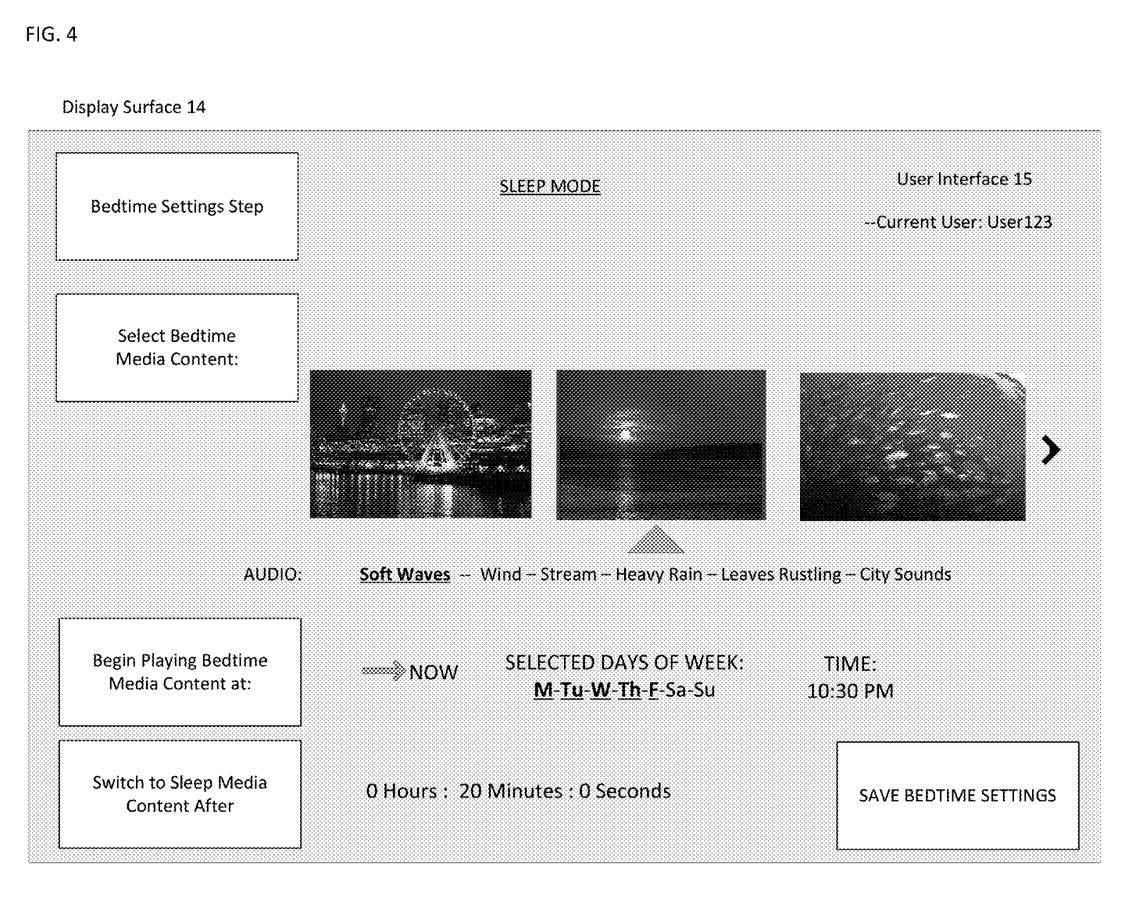
FIG. 4 illustrates a second view of the user interface displayed on the display device of the media delivery system of FIG. 1.

During the bedtime settings selection step of a sleep mode setup process, the user interface 15 is operable to allow the user to select a visual media content and/or an audio content to play during a bedtime period, as shown in FIG. 4. The selection of visual media content available for play during the bedtime period may be video scenes with subtle movement, such as a city at night. The selection of audio media content available may be a sound or combination of sounds that promote the user to fall sleep. The visual media content and the audio content available for selection in the bedtime settings step are stored in the database 24 accessible over the network 20, as described below. The user may upload his video media content or audio media content to the database 24, which are made available for selection during the bedtime settings step.

The user may operate the user interface 15 to select when the selected bedtime media content should begin playing. The user interface 15 may allow a user to configure the application 26 to begin playing the bedtime media content on selected days of the week at a certain time, or immediately play the bedtime media content after the sleep mode setup process is completed. The user may also operate the user interface 15 to select a bedtime period duration indicating how long the bedtime media will play for, or designate a time at which the bedtime media content will stop. In some embodiments, the application 26 may be configured to play the bedtime media content according to scheduled dates or times. For example, the user interface 15 may include a calendar which allows the user to designate days on which the application 26 will or will not execute the sleep mode.

Once the user is satisfied with the bedtime settings, the user may save the bedtime settings by selecting the "Save Bedtime Settings" button to move on to the next step. Upon completing the bedtime settings by selecting the "Save Bedtime Settings" button, the media delivery system 10 may save the bedtime settings of the user in the database 24 in association with a user profile.

Figure 5:
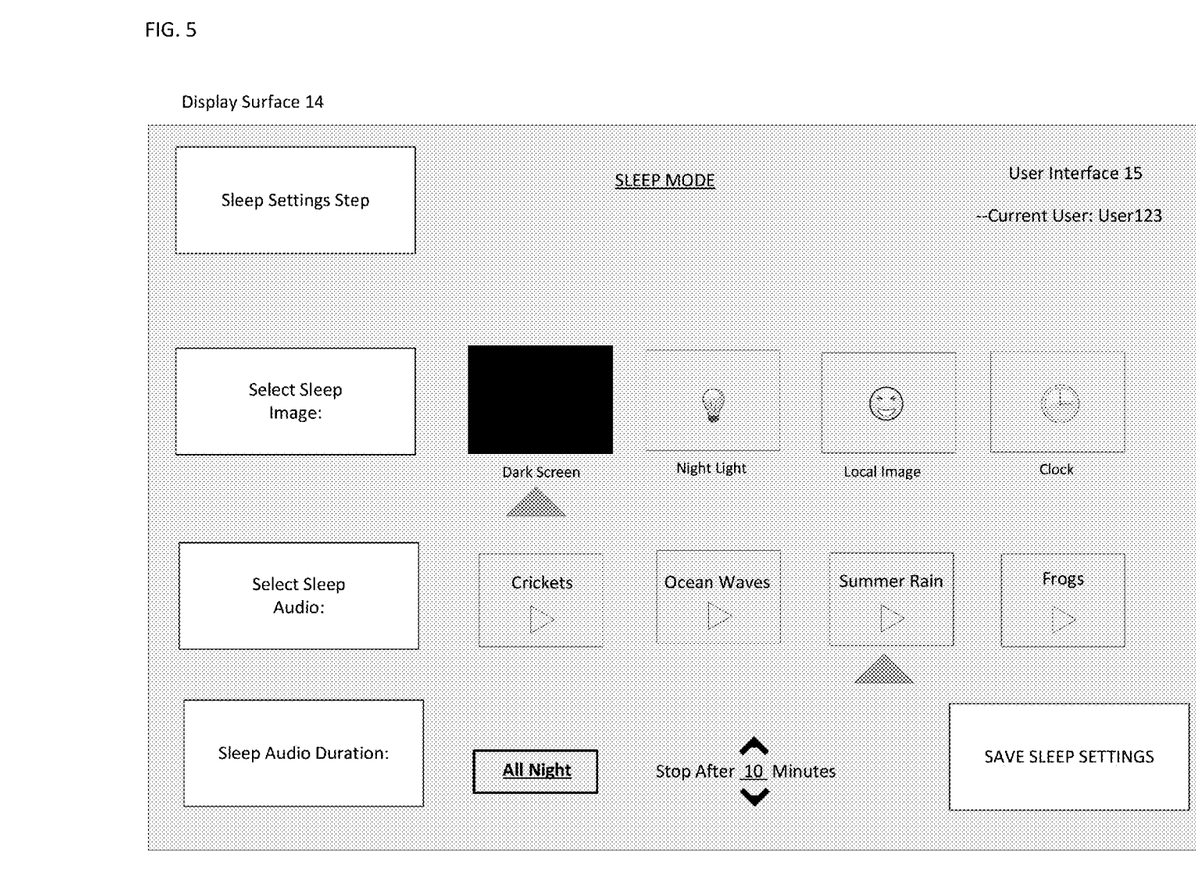
FIG. 5 illustrates a third view of the user interface displayed on the display device of the media delivery system of FIG. 1.

During the sleep settings selection step of the sleep mode setup process, the user interface 15 is operable to allow a user select an image content and/or audio content played during a sleep period after the bedtime period expires, as shown in FIG. 5. The image content and the audio content available for selection in the sleep settings step are stored in the local memory 24 or embedded within the application 26. In some embodiments, the image content or the audio content in the sleep period is locally cached media content that is downloaded after the sleep mode begins, as described below with reference to FIGS. 7 and 8. The image content may be a dark image, a night light, a clock, or an image stored on a local hard drive or local area network, for example. In some embodiments, the user interface 15 is operable to change various aspects of the sleep image. For example, the user interface 15 may allow the user to adjust the color or the brightness of the nightlight, or the brightness of the local image selected by the user.

The audio content selected to be played during the sleep period may be the same or different than the audio content played during the bedtime media period. The user interface 15 may be configured to adjust aspects of the sleep period audio content, such as duration or volume. The user interface 15 may allow the user to select whether the sleep period audio content plays the entire sleep period (i.e., all night) or whether the sleep period audio content will stop after a user defined period of time. In some embodiments, the user interface 15 may allow the user to select an option that causes the media delivery system 10 to gradually decrease the volume during the sleep period so as not to wake or disturb the user with a sudden change in volume. In other embodiments, the user interface may allow the user to select an option that causes the media delivery system 10 to gradually change the audio played from the audio content selected for the bedtime period to the audio content selected for the sleep period.

Once the user is satisfied with the sleep period settings, the user may save the sleep settings by selecting the "Save Sleep Settings" button to move on to the next step. Upon completing the sleep settings step by selecting the "Save Sleep Settings" button, the media delivery system 10 may save the bedtime settings of the user in the storage media 30 or the memory 34. In some embodiments, the media delivery system 10 may determine whether the sleep period image content or audio content is currently stored in the storage media 30 or the memory 34. In some embodiments, the processing unit 18 may issue a request to the server unit 22 to download the missing content if the sleep period image content or audio content is not currently stored in the storage media 30 or the memory 34.

Figure 6:
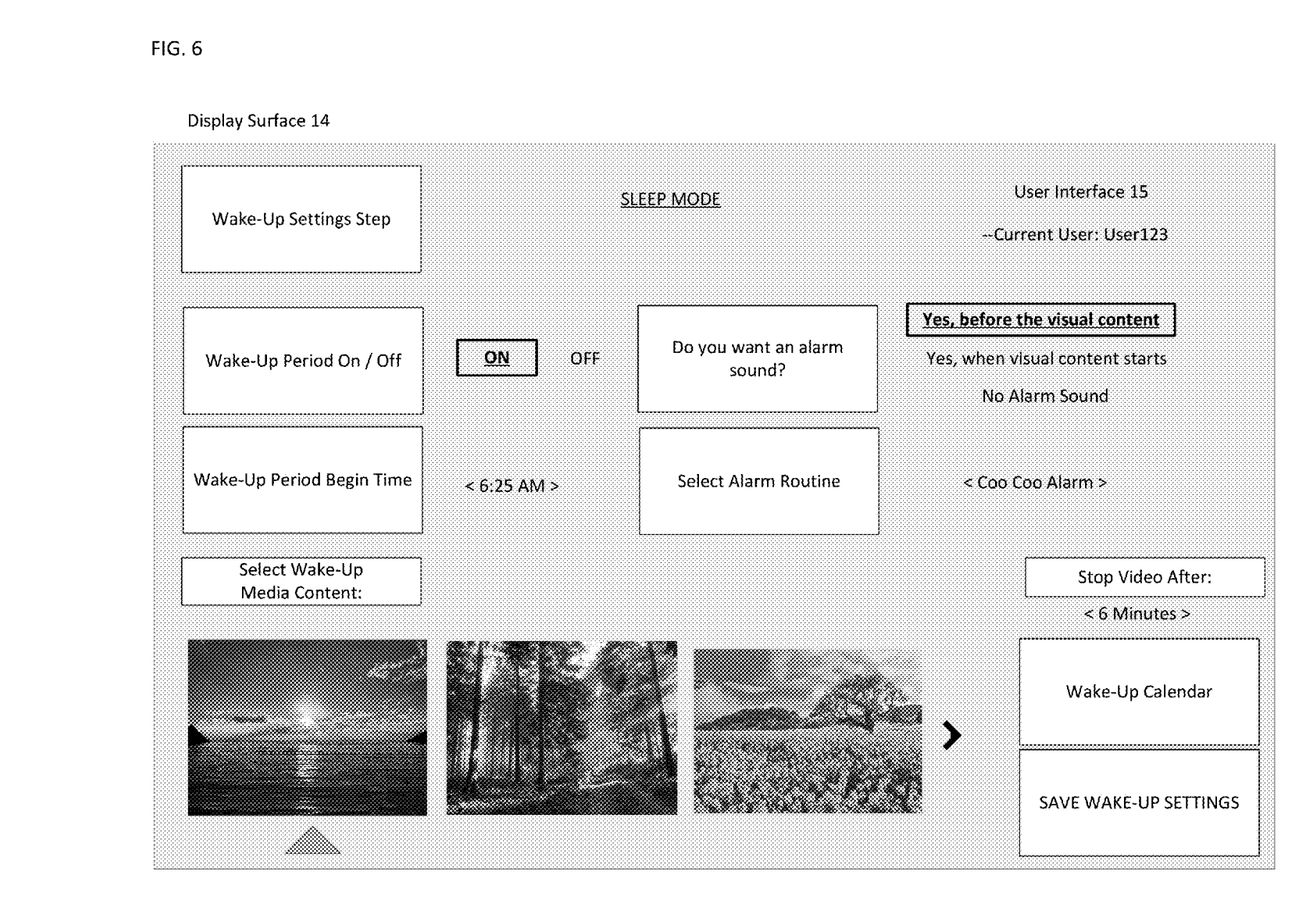
FIG. 6 illustrates a fourth view of the user interface displayed on the display device of the media delivery system of FIG. 1.

During the wake-up settings selection step of the sleep mode setup process, the user interface 15 is operable to allow the user to adjust if, when, and how the media delivery system 10 will wake up the user during a wake-up period, as shown in FIG. 6. The user interface 15 may include an option for activating or deactivating the wake-up period. If the wake-up period is "OFF", the media delivery system 10 will not attempt to wake-up the user after the sleep time period expires. If the wake-up period is "ON", the media delivery system 10 will attempt to wake-up the user according to the wake-up period settings.

The user interface 15 is operable to allow the user to adjust the time that the wake-up period begins, whether the media delivery system 10 will provide audio content such as an alarm routine during the wake-up period, and what audio content may be provided. The user interface 15 is operable to allow the user to select a visual media content to display during the wake-up period, and how long the visual media content will play. The user interface 15 may also include settings allowing the user to adjust whether the audio content is provided before, after, or at the same time that the visual content begins.

The visual media content available for selection in the wake-up setting step is stored in the database 24 accessible over the network 20, as described below. The visual media content available for play during the wake-up period may include video scenes with subtle movement, such as a sunrise over the ocean. In some embodiments, the audio content available for selection during the wake-up setting step is locally stored in the storage media 30 or the memory 34. In other embodiments, the audio content may be stored in the database 24. The user may upload his video media content or audio media content to the database 24, which are made available for selection during the wake-up setting step.

The user interface 15 may also allow a user to modify the wake-up settings according to a schedule or calendar. The user interface 15 may include a weekly schedule allowing the user to select days of the week on which the media delivery system 10 will activate the wake-up period, and deselect days of the week on which the media delivery system 10 will not activate the wake-up period. A wake-up calendar feature on the user interface 15 may allow the user to select days on which the wake-up period settings are modified. For example, the user may use the wake-up calendar feature to prevent the media delivery system 10 from activating the wake-up period on a specific date or to deliver special holiday themed visual content on holiday mornings.

The wake-up calendar feature may include an option for displaying a user-defined text reminder or message on certain days, such as reminding the user of an important birthday, meeting, or other event during the wake-up period. The user-defined message may require the user to acknowledge the message before the message will disappear to ensure that the user sees the reminder.

Once the user is satisfied with the wake-up period settings, the user may save the wake-up period settings by selecting the "Save Wake-Up Settings" button. Upon completing the wake-up period settings by selecting the "Save Wake-Up Settings" button, the media delivery system 10 may save the wake-up settings of the user in the database 24 in association with a user profile including user preferences.

After setting the bedtime period settings, the sleep period settings, and the wake-up period settings, the user interface 15 may present a summary of the settings and request confirmation from the user. In some embodiments, the media delivery system 10 may wait to save the bedtime period settings or the wake-up period settings of the user in the database 24 in association with the user profile until after receiving confirmation of the settings from the user.

Figure 7:
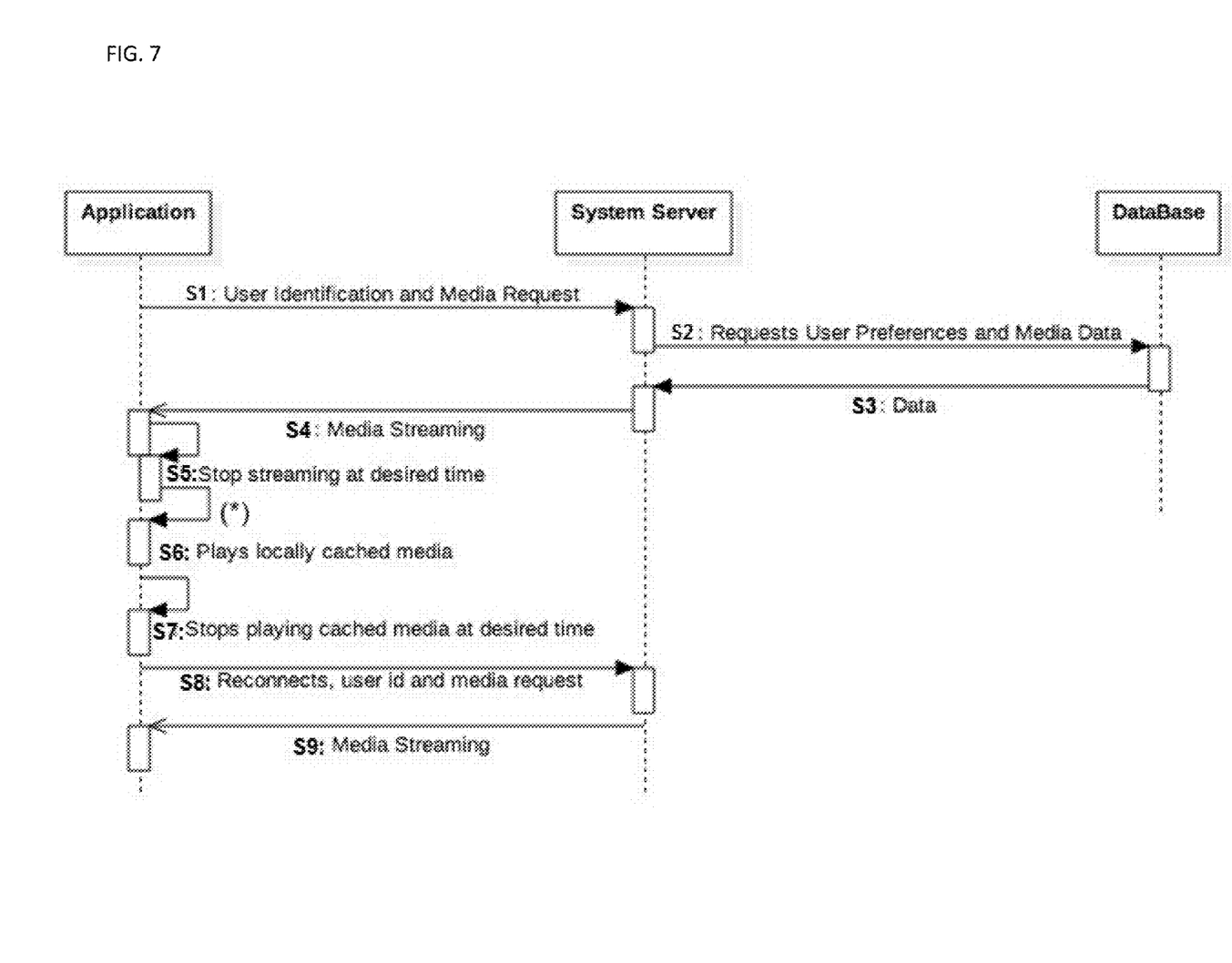
FIG. 7 illustrates a method of delivering media content.

A method of delivering media content in association with the media delivery system 10 is described with reference to FIG. 7. In particular, the method of delivering media content is described with reference to executing a cycle of the sleep mode according to the bedtime period settings, the sleep period settings, and the wake-up period settings defined by the user. When the application 26 determines that it is time to execute the cycle of the sleep mode based on a preset time or a user request, the application causes the processing unit 18 to communicate with the server unit 22. In step S1, the application 26 sends, to the server unit 22, the user identification information and a request to access the sleep mode media content. In particular, the application 26 may send a sleep mode media content request requesting the server unit 22 to retrieve the bedtime media content, the sleep period media content, and the wake-up media content not stored in the storage media 30 or the memory 34. In step S2, the server unit 22 sends a request to the database 24 to send media data corresponding to the sleep mode media content requested and user preferences associated with the user identification information. In step S3, the database 24 sends the requested media data to the server unit 22. The server unit 22 then begins streaming the requested bedtime media content data to the processing unit 18 in step S4. The processing unit 18 processes the bedtime media content data received and sends the processed bedtime media content to be played on the display device 12. The server unit 22 may continue to stream the bedtime media content data to the processing unit 18 until the bedtime time period specified in the bedtime settings is achieved. Once the bedtime time period is achieved, the server unit 22 stops streaming the bedtime media content in step S5 and the application 26 begins to transition to the sleep period.

In step S6, the processing unit 18 plays locally saved sleep period media content on the display device 12. The sleep period media content may be saved on the memory 34 or the storage media 30 prior to the cycle of the sleep mode. In some embodiments, however, sleep period media content data is locally cached media content that is downloaded after the cycle of the sleep mode is initiated. The sleep period media content data may be downloaded along with the streaming of the bedtime media content data in step S4 when the bandwidth of the network 20 is sufficient. Alternatively, the processing unit 18 may execute a process of piecewise downloading the sleep period media content data after step S4 begins, as described below with reference to FIG. 8. The processing unit 18 causes the display device 12 to play the sleep period media content during the entire desired sleep period duration. Once the desired sleep period duration is achieved, the processing unit 18 causes the display device 12 to stop playing the sleep period media content in step S7.

In step S8, the application 26 causes the processing unit 18 to send, to the server unit 22, the user identification information and a request to stream the wake-up media content. In step S9, the server unit 22 then begins streaming the requested wake-up media content data to the processing unit 18. The processing unit 18 processes the wake-up media content data received and sends the processed wake-up media content to be played on the display device 12. The server unit 22 may continue to stream the wake-up media content data to the processing unit 18 until the wake-up period specified in the user preferences expires or until the processing unit 18 sends a request to stop streaming the wake-up media content data according to the wake-up settings.

The processing unit 18 may cause the display device 12 to play the wake-up period audio content, such as the selected alarm routine, and to display a message prompting the user to respond to the audio content until the user signals that he is awake via the input device 19. The processing unit 18 will cause the display device 12 to display the selected visual media content for the wake-up period according to the wake-up settings. For example, the processing unit 18 will continue to receive streaming visual media content data from the server unit 22 until the specified duration for displaying the wake-up period visual media content is achieved. In the example shown in FIG. 6, the processing unit 18 will receive the visual media content for 6 minutes after the user turns the alarm routine off via the input device 19. In other embodiments, an alarm routine may associate particular visual media content with alarm audio content (i.e., alarm sound). For example, a rooster alarm routine may include visual media content of a rooster crowing accompanied by audio media content of the rooster crowing. The rooster visual media content or the rooster audio media content may gradually increase in volume or intensity to promote the user to awake. Once the user operated the input device 19 to indicate that the user is awake, the server unit 22 may begin streaming additional wake-up media content for presentation on the display device 12 according to the wake-up settings. For example, the server unit 22 may stream visual media content along with a reminder message specified in the wake-up calendar. After the processing unit 18 stops receiving the streamed wake-up period media content, the cycle of the sleep mode has ended.

Figure 8:
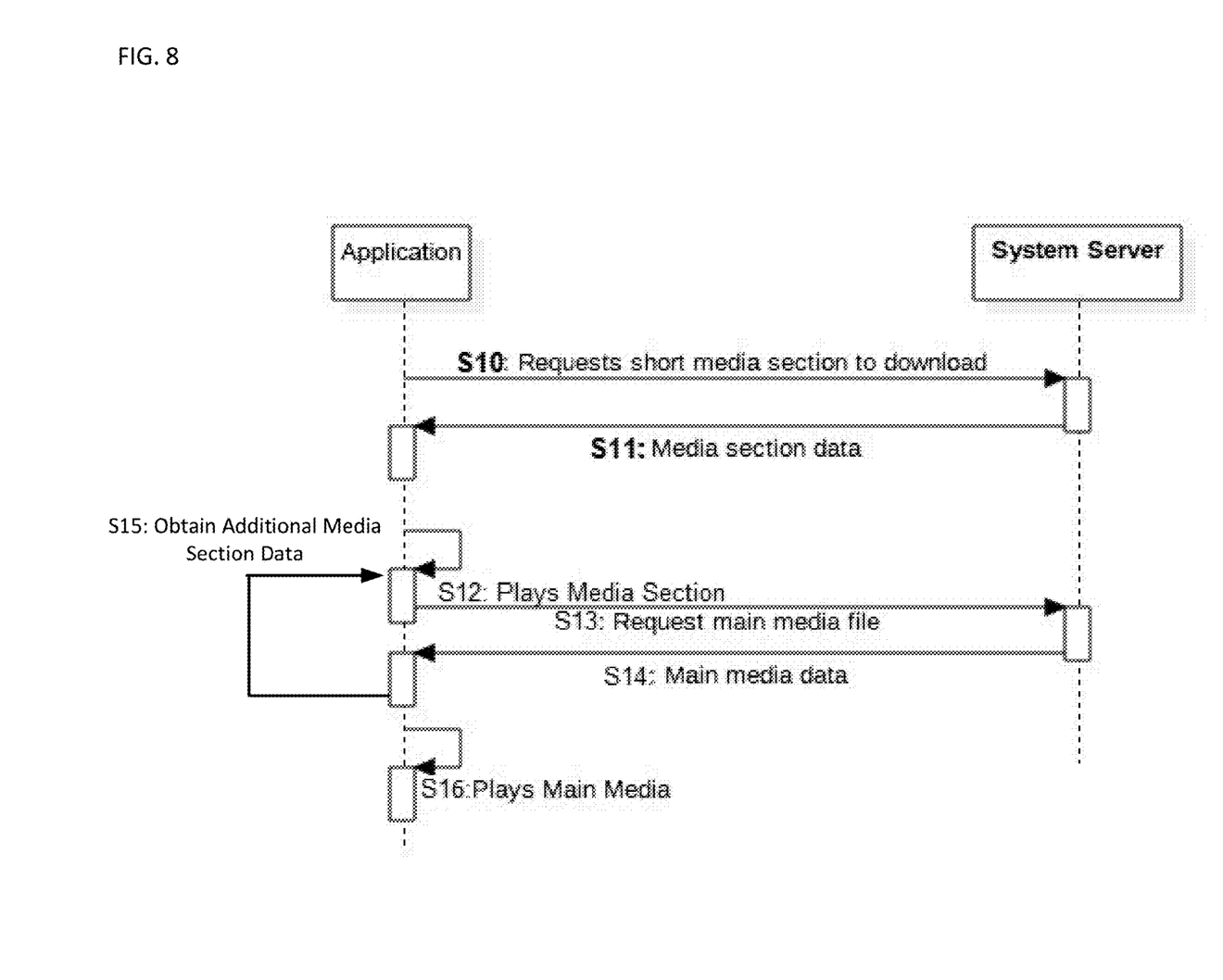
FIG. 8 illustrates a process of delivering locally cached media content in the method of FIG. 7.

A method for downloading and playing temporarily cached media content is shown in FIG. 8. In some instances, media content is not stored on the memory 34 or the storage media 30, or streamed from the server unit 22. In steps S6 to S7 of the media delivery method shown in FIG. 7, the processing unit 18 attempts to play locally stored sleep period media content from the memory 34 or the storage media 30 instead of streaming the media content from the server unit 22. When the sleep period media content is not available on local storage, the processing unit 18 will request to download the media content from the server unit 22. However, a seamless transition from the bedtime period to the sleep time period is desirable so as not to disturb the user's sleep. A goal of the method shown in FIG. 8 is therefore to minimize or eliminate the gap between playing the streaming media content and playing the local media content.

The media delivery system 10 may initiate the method for downloading and playing temporarily cached media content shown in FIG. 8 during the media streaming of step S4, for example. In a preliminary step, the processing unit 18 may search the memory 34 or the storage media 30 to determine whether the sleep period media content, such as the audio content, is locally stored. If the processing unit 18 determines that the sleep period media content is not available in local storage, the processing unit 18 sends a request to download a media content section of the sleep period media content from the server unit 22 in step S10. The media content section requested is a section of the complete sleep period media content, such as a short, continuous section of an audio file or a moving image file. The media content section has a smaller size than the complete sleep period media content and is therefore more quickly transferred from the server unit 22 to the processing unit 18. The processing unit 18 may send the request to download the media content section during the streaming in step S4 or thereafter.

In step S11, the server unit 22 sends the media content section data to the processing unit 18. In step S12, the processing unit 18 receives and processes the media content section data and causes the display device 12 to play the media content section. The processing unit 18 may cause the display device 12 to loop the media content section while the processing unit 18 obtains the rest of the sleep period media content in steps S13 to S15. For example, if the audio content is an audio file comprising a soundtrack of crickets chirping, the media content section may include one or more cricket chirps that the processing unit 18 causes the display device 12 to repeatedly play while the remainder of the audio content is obtained.

In step S13, the processing unit 18 may send a request to the server unit 22 requesting the remainder of the sleep period media content data. In step S14, the server unit 22 sends the remainder of the sleep period media content data to the processing unit 18. In step S16, the processing unit 18 may receive and process the remainder of the sleep period media content data and merge the remainder of the sleep period media content data with the media content section data obtained in step S11 to obtain a complete version of the sleep period media content. While the processing unit 18 is downloading or processing the remainder of the sleep period media content data, the processing unit 18 may cause the display device 12 to continually play the media content section. Once the processing unit 18 obtains and processes the complete version of the sleep period media content, the processing unit may the cause the display device 12 to play the complete version of the sleep period media content for the remaining sleep period duration.

In some embodiments, in step S13, the processing unit 18 may send a request to the server unit 22 requesting the entire, complete version of the sleep period media content instead of the remainder thereof. Then, the server unit 22 may send data including the complete sleep period media content data to the processing unit 18 in step S14. In step S16, the processing unit may download and process the complete sleep period media content data. While the processing unit 18 is downloading or processing the complete sleep period media content data, the processing unit 18 may cause the display device 12 to continually play the media content section. Once the processing unit 18 obtains the complete version of the sleep period media content, the processing unit may the cause the display device 12 to play the complete version of the sleep period media content for the remaining sleep period duration.

In some embodiments, the method of downloading and playing temporarily cached media content may be a recursive process in which the media content section is repeatedly augmented until the complete version of the sleep period media content is obtained. After obtaining an initial media content section data in step S12, the processing unit 18 may, in step S13, send a request to the server unit 22 to transmit a second media content section that is a different section of the complete sleep period media content than the media content section transmitted in step S11. In step S14, the server unit 22 may send the second media content section to the processing unit 18 for download. In step S15, the processing unit 18 may return to step S12 to obtain an additional media content section if the processing unit 18 has not obtained all media content sections from the server unit 22. The processing unit 18 may process the second media content section data obtained in step S14 and merge the second media content section data with the initial media content section data to obtain a larger media content section.

Returning to step S12, the processing unit 18 may cause the display device 12 to play the larger media content section if the initial media content section data and second media content section data are successfully merged. Otherwise, the processing unit 18 may cause the display device 12 to continue playing the initial media content section. In step S13, the processing unit 18 sends a request to the server unit 22 requesting the additional media content section. In step S14, the server unit 22 may send the additional media content data to the processing unit 18 for download. In step S15, the processing unit 18 may again return to step S12 to obtain an additional media content section if the processing unit 18 has not obtained all of the media content sections comprising the complete media content from the server unit 22. Steps S12 through S15 may be repeated until the processing unit 18 obtains all of the media content sections from the server unit 22. In step S16, the processing unit 18 may process any unprocessed media content sections, and merge all the media content sections to obtain the complete sleep period media content. Once the processing unit 18 obtains the complete version of the sleep period media content, the processing unit may cause the display device 12 to play the complete version of the sleep period media content for the remaining sleep period duration.

The method of delivering media content and method for downloading and playing temporarily cached media content described above overcome disadvantages of lapse in video and expense associated with streaming media content.

Although the media delivery system 10 is described with reference to the sleep mode of the application 26, the above-described features may also be executed in other modes. For example, the ambiance mode may be provided that streams media content during a first period over the network 20, plays a locally saved picture slideshow accompanied by locally saved music stored on the memory 34 during a second period, then resumes streaming media content over the network 20 during a third period. The ambiance mode may automatically create ambiance during a family gathering on Christmas, for example, by streaming holiday themed songs and visual media content with family pictures stored on a local storage device.

The media delivery system 10 may be accessible on an internet website or the application. For example, the user may access, edit, and upload user preferences and user-defined content for the media delivery system 10 using an internet browser or a mobile device application configured to execute on a mobile device. When accessing the media delivery system 10 using the internet browser or the mobile device application, the user may upload personal media content to the server unit 22 (see FIG. 9). The personal media content may be a video or audio content recorded by the user or otherwise stored on a local device, such as a favorite TV show episode, by way of non-limiting example. The uploaded media content may be streamed to the processing unit 18 from the server 22 using the application 26. The uploaded media content may be available at a location other than the user's home using the application 26. Advantageously, the user may then experience a familiar sleep mode cycle when sleeping in a hotel, for example.

Figure 9:
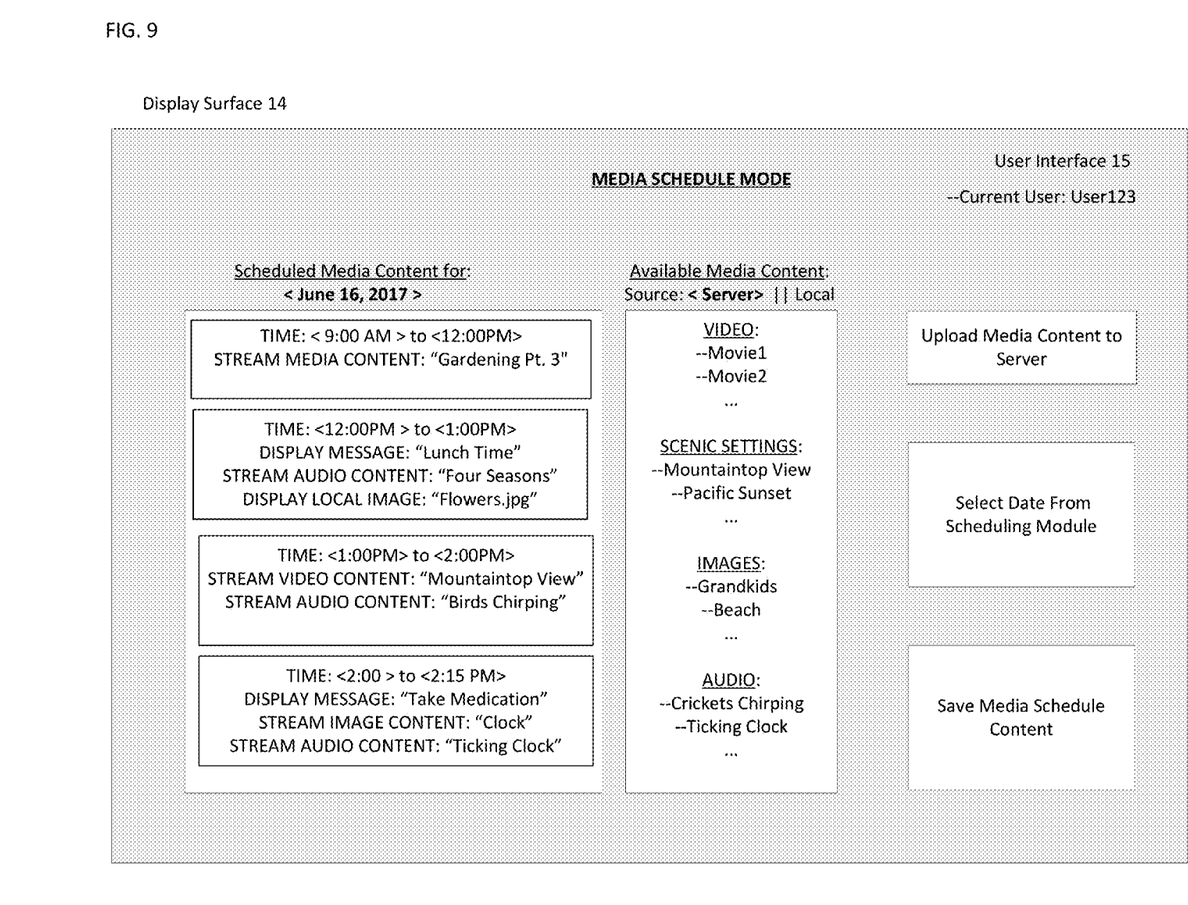
FIG. 9 illustrates a fifth view of the user interface displayed on the display device of the media delivery system of FIG. 1.

The media schedule mode of the application 26 may allow a user to completely customize the media content provided via the media delivery system 10 at a specific day or time according to a scheduling module shown in FIG. 9. The media schedule mode may run in the background and control the media content delivered by the media delivery system 10 when another mode is not actively engaged. The user may select specific media content to be streamed or played at a scheduled time or date.

In FIG. 9, the media schedule mode is accessed to schedule media content that will be played on a certain date ("Jun. 16, 2017" as shown). For example, from 9 AM to 12 PM on the certain date, the media delivery system 10 will cause the server unit 22 to stream media content "Gardening Pt. 3" to the processing unit 18 for display on the display device 12. At 12:00 PM, the server unit 22 will stop streaming "Gardening Pt. 3" and begin streaming different media content data for displaying a message "Lunch Time" over a locally saved image "Flowers.jpg" while streaming audio content "Four Seasons". From 1:00 PM to 2:00 PM, the server unit 22 streams video media content "Mountaintop View" and audio content "Birds Chirping" for presentation on the display device 12.

The media delivery system 10 allows a user to completely control the media content presented at a specific time or on a specific date. The user may control the media content presented on an elderly relative's media delivery system 10 to help prevent the elderly relative from becoming frustrated with operation of the display device 12. The user may also send daily reminders to the elderly relative regarding daily medication or important appointments. The media delivery system 10 may also allow the user to control the media content that a child views by setting a daily schedule. The user may also cause the media delivery system 10 to deliver media content containing a special message to a child or loved one on a certain day, such as a birthday or anniversary. The media delivery system 10 may allow the user to deliver a video message, such as a good morning greeting or reading a bedtime story, to a child at a specific time when the user is away. Those of ordinary skill in the art will appreciate that these advantages and implementations are non-limiting and illustrative of the myriad ways in which the media delivery system 10 may be implemented to overcome the deficiencies of previous media systems.

Various embodiments of the invention are described above in the detailed description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of various embodiments of the invention known to the applicant at the time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A media delivery system for delivering media content to a user at predetermined times, the media delivery system comprising:

a processing unit electronically coupled to a first communication interface that is configured to communicate over a network;

a computer-readable storage medium storing a programming module configured to be executed on the processing unit;

a display device electronically coupled to the processing unit;

a media storage unit electronically coupled to the processing unit; and the programming module being configured to cause the processing unit to:

receive a user instruction including a first media selection of a first media content stored on the network, a first time setting, a second media selection of a second media content, a second time setting, a third media selection of a third media content stored on the network, and a third time setting, send a request to a remote server unit over the network requesting the server unit to stream the first media content over the network beginning at a first time corresponding to the first time setting, cease streaming the first media content at a second time corresponding to the second time setting, and to stream the third media content over the network beginning at a third time corresponding to the third time setting, receive the first media content streamed over the network beginning at the first time, play the first media content on the display device beginning at the first time and ceasing at the second time, play the second media content on the display device beginning at the second time by:

determining, before the second time, whether the second media content is stored on the media storage unit, sending, in response to determining that the second media content is not stored on the media storage unit, a request to transmit a second media content section that is an executable section of a complete version of the second media selection, receiving the second media content section, processing, at the second time, the second media content section, sending, from the first communication interface after receiving at least part of the second media content section, a request for an additional second media content section, receiving the additional second media content section, and processing the additional second media content section, cease playing the second media content at the third time, receive the third media content over the network beginning at the third time, and play the third media content on the display device beginning at the third time.

2. The media delivery system of claim 1, wherein the first media content and the third media content are stored in a database on the network.

3. The media delivery system of claim 1, wherein the media storage unit is located on a same local network as the processing unit, and the server unit is located on a different local network than the processing unit.

4. The media delivery system of claim 1, wherein the first media selection comprises at least video content and audio content.

5. The media delivery system of claim 1, wherein the third media selection comprises at least video content and audio content.

6. The media delivery system of claim 1, the programming module further configured to cause the processing unit to receive the second media content section during streaming the first media content.

7. The media delivery system of claim 1, the programming module further configured to cause the processing unit to play the second media content section two or more times on the display device.

8. The media delivery system of claim 1, the programming module further configured to cause the processing unit to receive the additional second media content section during processing the second media content section.

9. A computer program product comprising at least one non-transitory computer-readable medium storing computer-executable code for delivering media content to a user at predetermined times, the computer-executable code causing a processing unit to perform the steps of:

processing a user instruction including a first media selection of a first media content located on a remote network, a first time setting, a second media content selection of a second media content, a second time setting, a third media selection of a third media content located on the remote network, and a third time setting;

receiving and storing, at a server location, the first media selection, the first time setting, the second time setting, and the third time setting;

streaming, at a first time corresponding to the first time setting, the first media selection over an internet connection to a local location;
ceasing streaming the first media selection at a second time corresponding to the second time setting;
processing the second media content by:
  determining, before the second time, whether the second media content is stored on the local network;
  sending, in response to determining that the second media content is not stored on the local network, a request to transmit a second media content section that is an executable section of a complete version of the second media selection;
  receiving the second media content section;
  processing, at the second time, the second media content section;
  sending, after receiving at least part of the second media content section, a request to transmit an additional second media content section;
  receiving the additional second media content section; and
  processing the additional second media content section;
ceasing processing of the second media content at a third time corresponding to the third time setting; and
streaming, at the third time the third media content over the internet connection.

10. The computer program product of claim 9, wherein the first media content comprises at least one of a visual content or an audio content, and streaming the first media content further comprises processing the first media content.

11. The computer program product of claim 9, wherein the second media content includes a visual content and an audio content, and processing the second media content further comprises processing the visual content in association with the audio content.

12. The computer program product of claim 9, wherein the receiving second media content section occurs during streaming the first media content.

13. The computer program product of claim 9, wherein the processing the second media content section further includes causing an associated display device to play the second media content section two or more times.

14. The computer program product of claim 9, wherein receiving the additional second media content section occurs during processing the second media content section.

15. A computer-implemented method for delivering media content to a user at predetermined times, the method comprising:
receiving a user instruction at a local location, the user instruction including a first media selection of a first media content located on a remote network, a first time setting, a second media content selection of a second media content, a second time setting, a third media selection of a third media content located on the remote network, and a third time setting;
receiving and storing, at a server location, the first media selection, the first time setting, the second time setting, and the third time setting;
streaming, at a first time corresponding to the first time setting, the first media selection over an internet connection to a local location;
ceasing streaming the first media selection at a second time corresponding to the second time setting;
processing the second media content by:
  determining, before the second time, whether the second media content is stored on the local network;
  sending, in response to determining that the second media content is not stored on the local network, a request to transmit a second media content section that is an executable section of a complete version of the second media selection;
  receiving the second media content section;
  processing, at the second time, the second media content section;
  sending, after receiving at least part of the second media content section, a request to transmit an additional second media content section;
  receiving the additional second media content section; and
  processing the additional second media content section;
ceasing processing of the second media content at a third time corresponding to the third time setting; and
streaming, at the third time the third media content over the internet connection.

16. The computer-implemented method of claim 15, wherein the first media content comprises at least one of a visual content or an audio content, and streaming the first media content further comprises processing the first media content.

17. The computer-implemented method of claim 15, wherein the second media content includes a visual content and an audio content, and processing the second media content section further comprises processing the visual content in association with the audio content.

18. The computer-implemented method of claim 15, wherein the receiving second media content section occurs during streaming the first media content.

19. The computer-implemented method of claim 15, wherein the processing the second media content section further includes causing an associated display device to play the second media content section two or more times.

20. The computer-implemented method of claim 15, wherein receiving the additional second media content section occurs during processing the second media content section.

* * * * *